(12) United States Patent
Myers et al.

(10) Patent No.: US 6,618,594 B1
(45) Date of Patent: Sep. 9, 2003

(54) OVER THE AIR USER ZONE ASSIGNMENT FOR WIRELESS TELEPHONY SYSTEMS

(75) Inventors: Theodore James Myers, East Dundee, IL (US); Patrick Jay Walsh, Bloomingdale, IL (US)

(73) Assignee: Ameritech Corporation, Hoffman Estates, IL (US)

( * ) Notice: Subject to any disclaimer, the term of this patent is extended or adjusted under 35 U.S.C. 154(b) by 0 days.

(21) Appl. No.: 09/399,402

(22) Filed: Sep. 20, 1999

(51) Int. Cl.[7] ................................................. H04B 1/38
(52) U.S. Cl. ........................................ 455/457; 455/441
(58) Field of Search ................................. 455/436, 437, 455/440, 448, 457, 456, 566, 422, 441, 423, 418, 414, 525, 426, 432, 552, 553

(56) References Cited

U.S. PATENT DOCUMENTS

| | | | |
|---|---|---|---|
| 5,295,180 A | | 3/1994 | Vendetti et al. |
| 5,428,666 A | * | 6/1995 | Fyfe et al. ..................... 379/58 |
| 5,559,520 A | | 9/1996 | Barzegar et al. |
| 5,758,288 A | | 5/1998 | Dunn et al. |
| 6,058,305 A | * | 5/2000 | Chavez, Jr. .................. 455/426 |
| 6,198,930 B1 | * | 3/2001 | Schipper ....................... 455/440 |
| 6,243,572 B1 | * | 6/2001 | Chow et al. ................. 455/408 |

* cited by examiner

*Primary Examiner*—William Trost
*Assistant Examiner*—Naghmeh Mehrpour

(57) ABSTRACT

A method of defining a user zone for a mobile user terminal in a wireless communication system including a network controller providing communication services to a plurality of mobile user terminals. The method includes the steps of locating a user terminal within the wireless communication system, referencing at least one user-selected vector from the user terminal location, and transmitting the vector information to the network controller. The network controller, in turn, generates a user zone associated with the user terminal as a function of the vector information such that the user zone defines a geographic region wherein the user terminal can access communication services of the communication system without incurring out-of-network fees. In one aspect of the invention, the user terminal includes a GPS receiver for determining the location of the user terminal and providing a reference for the user-selected vectors defining the desired user zone.

17 Claims, 4 Drawing Sheets

OVER THE AIR USER ZONE ASSIGNMENT FOR WIRELESS TELEPHONY SYSTEMS

TECHNICAL FIELD

The present invention relates to wireless communication systems and, in particular, to a system and method for over-the-air user zone assignments for wireless telephone systems.

BACKGROUND OF THE INVENTION

Wireless communication networks which provide mobile telephone and other related services to customers across a broad frequency spectrum are well known. One example of a cellular telephone network having radio transmissions in the microwave band of between approximately 800 MHz and 2.2 GHz is shown in FIG. 1. The prior art cellular telephone network of FIG. 1 includes a mobile telephone switching center (MSC) 10 and a plurality of cell site transceivers 12A through 12C. The cellular transceivers transmit radio signals to and receive radio signals from one or more mobile units 14 that move about a cellular service area 16. A mobile unit 14 can be a wireless voice telephone or data receiver that can be permanently installed at a fixed location within a vehicle, or portably carried by a person. Each cellular transceiver 12 is able to broadcast and receive the radio signals within a geographic area 18, referred to as the cell site coverage area. Together the areas 18 comprise the entire cellular service area 16.

Telephone calls to a mobile unit 14 can originate from another mobile unit or a land-based telephone via the public switched telephone network (PSTN) 20. This is accomplished by receiving a call request at the MSC 10. In turn, the MSC 10 instructs the central call processor 22 to begin call processing. The central call processor 22 transmits the signal to each of the cellular transceivers 12, causing the transceivers to transmit a page signal to the mobile unit 14.

The cellular service area 16 within which the mobile unit 14 can operate is referred to as the home area. For billing purposes, a mobile unit 14 is typically associated with a defined home area 16. Within the home area 16, calls and/or data can be placed to or received from the mobile unit 14 for a predetermined fee arrangement with the communication service provider. For areas outside of the home area 16 where cellular transceivers are present, voice and/or data transmissions are still possible to the mobile unit, however, additional fees are typically associated with such transmissions. These are commonly referred to as "roaming" charges or out-of-network fees.

There are several drawbacks associated with having predefined home areas. For example, a user may live in a border region served by two adjacent carriers. In such case, approximately half of the user's telephone transmissions may occur within one zone and half may occur in the other area, resulting in "roaming" charges for half of the user's telephone calls. To remedy this, the user may contract for services within both adjacent areas, however this may necessitate having two mobile units for a single user and, possibly, two service provider contracts. It would therefore be preferable if a user could define its own desired user area.

In addition, there are many areas 18 within mobile communication networks with under-utilized transmission bandwidth. Presently, there is no known method of dynamically making this bandwidth available to potential mobile communications users. To take advantage of the available bandwidth throughout a mobile communications network, it would, therefore, be desirable to offer such geographically defined regions to potential users of such services.

Alternatively, it would be desirable to allow users to request access to a mobile communications network at a location remote from their own user area. For example, while traveling, a businessperson could request mobile communication services in the city or region of travel. In response, the provider of the mobile communication services could offer the user geographic zone and pricing information to make use of available communication services. If more than one service provider was in the region, competing bids for such services could be provided. Thus, a service provider with more available bandwidth in the user requested region could likely provide a lower bid for the services desired. One advantage to such a system is that the user has flexibility in defining the desired user zone. Another advantage is that service providers can maximize network utilization and create additional revenue.

The present invention overcomes the drawbacks associated with present wireless communication systems by providing a method and system for user-defined user zones.

BRIEF DESCRIPTION OF THE DRAWINGS

The foregoing aspects and advantages of the invention will become more readily appreciated with reference to the following detailed description when viewed in conjunction with the accompanying drawings wherein.

DETAILED DESCRIPTION OF THE PREFERRED EMBODIMENT(S)

Figure 1:
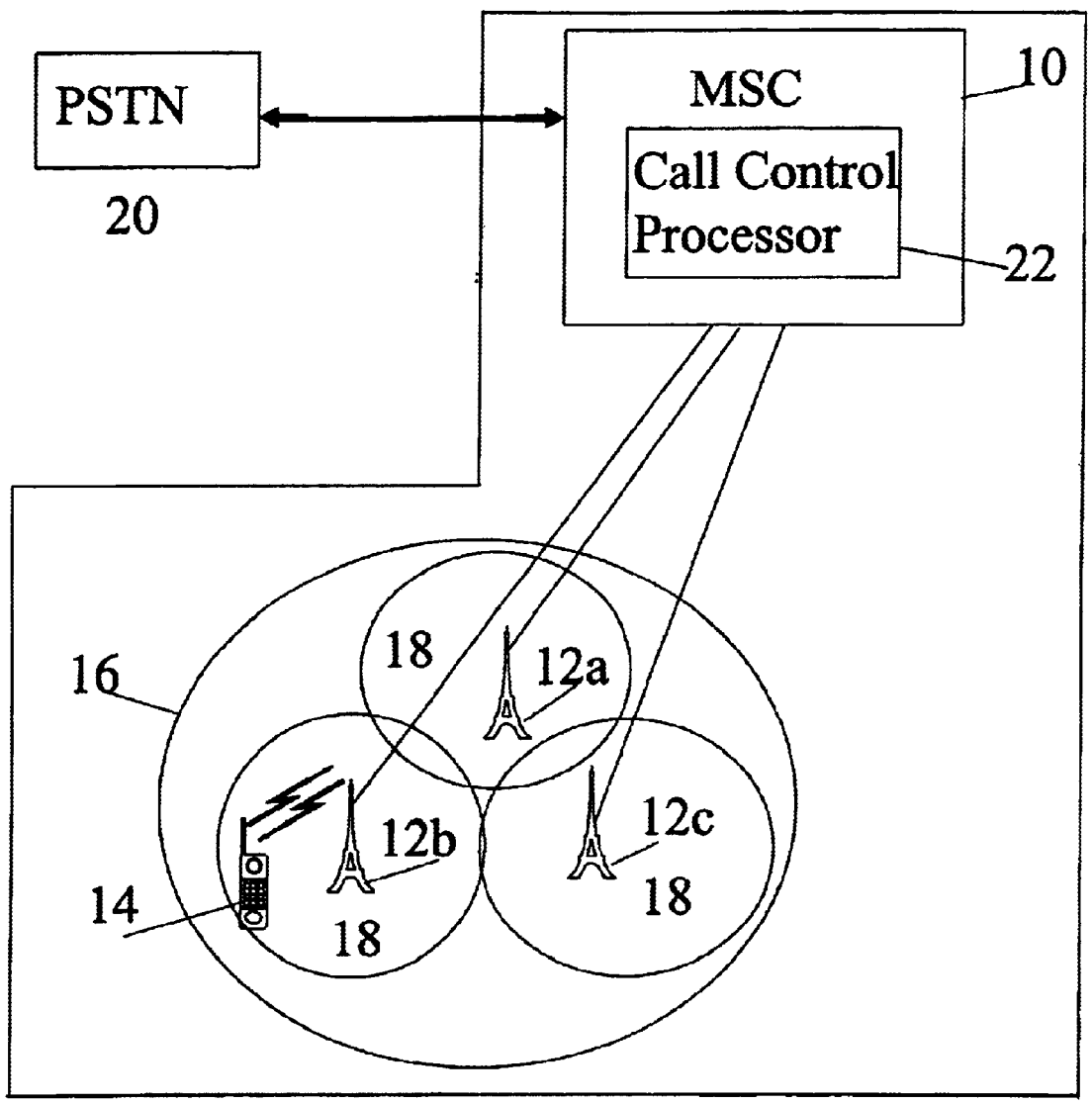
FIG. 1 is a diagram of a cellular telephone system according to the prior art.
Figure 2:
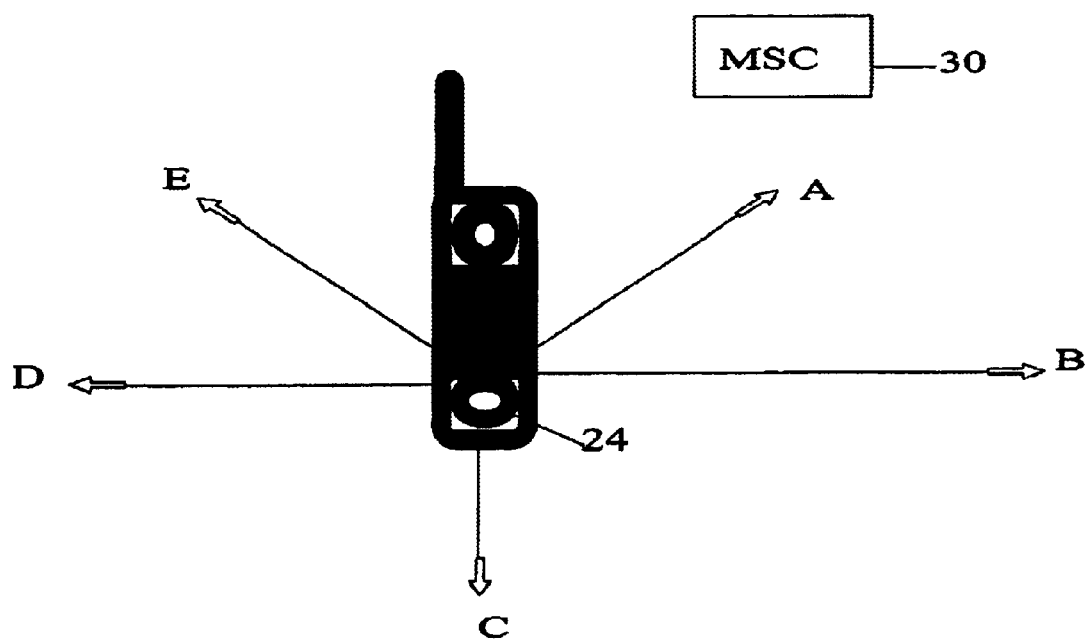
FIG. 2 is a diagram of a user-defined zone assignment in accordance with one embodiment of the present invention.

FIG. 2 is a diagram of an embodiment of an over-the-air user zone assignment in accordance with one embodiment of the present invention. The system as shown in FIG. 2 allows a user terminal 24 to define a user zone of any shape in areas where the user terminal 24 may be roaming. The user zone is defined as follows: A user terminal 24 begins with location information for its current position which is either provided by the network controller such as mobile switching center 30 or determined by a global positioning system (GPS) as described below with reference to FIG. 4. The position information can be latitude and longitude information, but is preferably presented with reference to a map indicating the present location of the user terminal 24.

Given the current position information, the user terminal 24 communicates vector information to the MSC 30 over the air specifying an angle and magnitude from the current user terminal position. These vectors represent points in two-dimensional space with angles referenced to the direction north, like points on a compass. The magnitude represents the distance from the user's current location along the angle in units of, for example, meters. Thus, in FIG. 2, vector A represents 35 degrees from north and 100 meters from the user terminal 24. Vector B represents 90 degrees from north and 120 meters from the user terminal 24. Vector C represents 180 degrees from north and 100 meters from the user terminal 24. Vector D represents 270 degrees and 150 meters from the user terminal 24. Vector E represents 300 degrees from north and 140 meters from the user terminal 24.

This vector information is then transmitted to the network controller such as the MSC 30 which processes the vector information to connect the points A, B, C, D, and E together, using line segments, thereby defining a geographical area for the temporary user zone. These points and space can represent any geometric shape.

Figure 3:
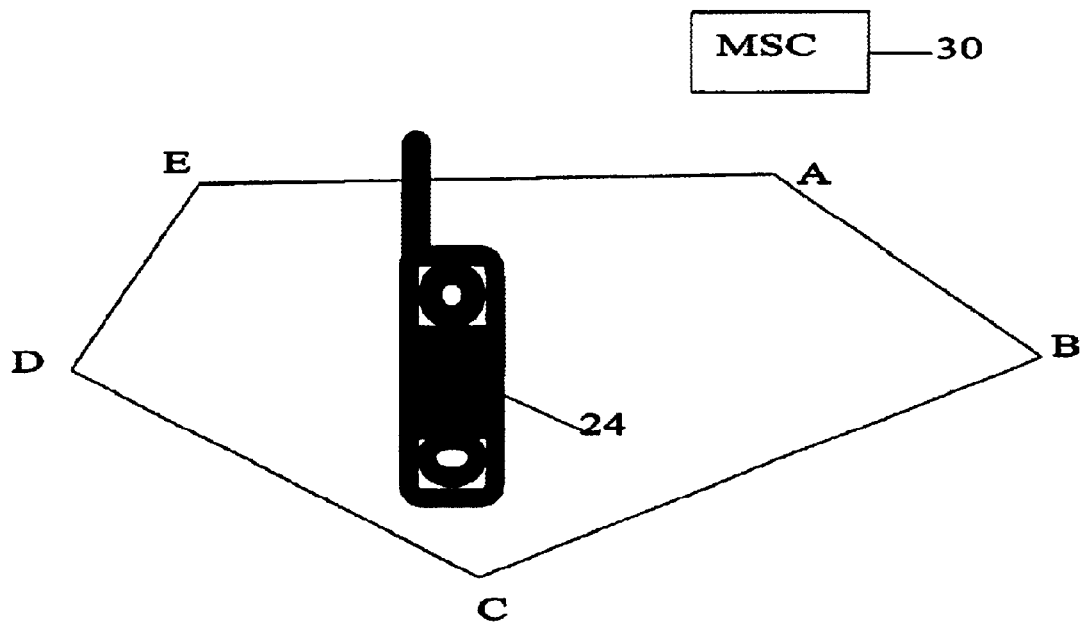
FIG. 3 is another diagram of the user zone assignment according to FIG. 2.

FIG. 3 represents the user zone 40 as defined by the vector information given from FIG. 2. Given this defined user zone 40, the user terminal 24 could transmit and receive communications anywhere within the geographical boundaries of the user zone 40 without incurring roaming or out-of-network charges.

Figure 4:
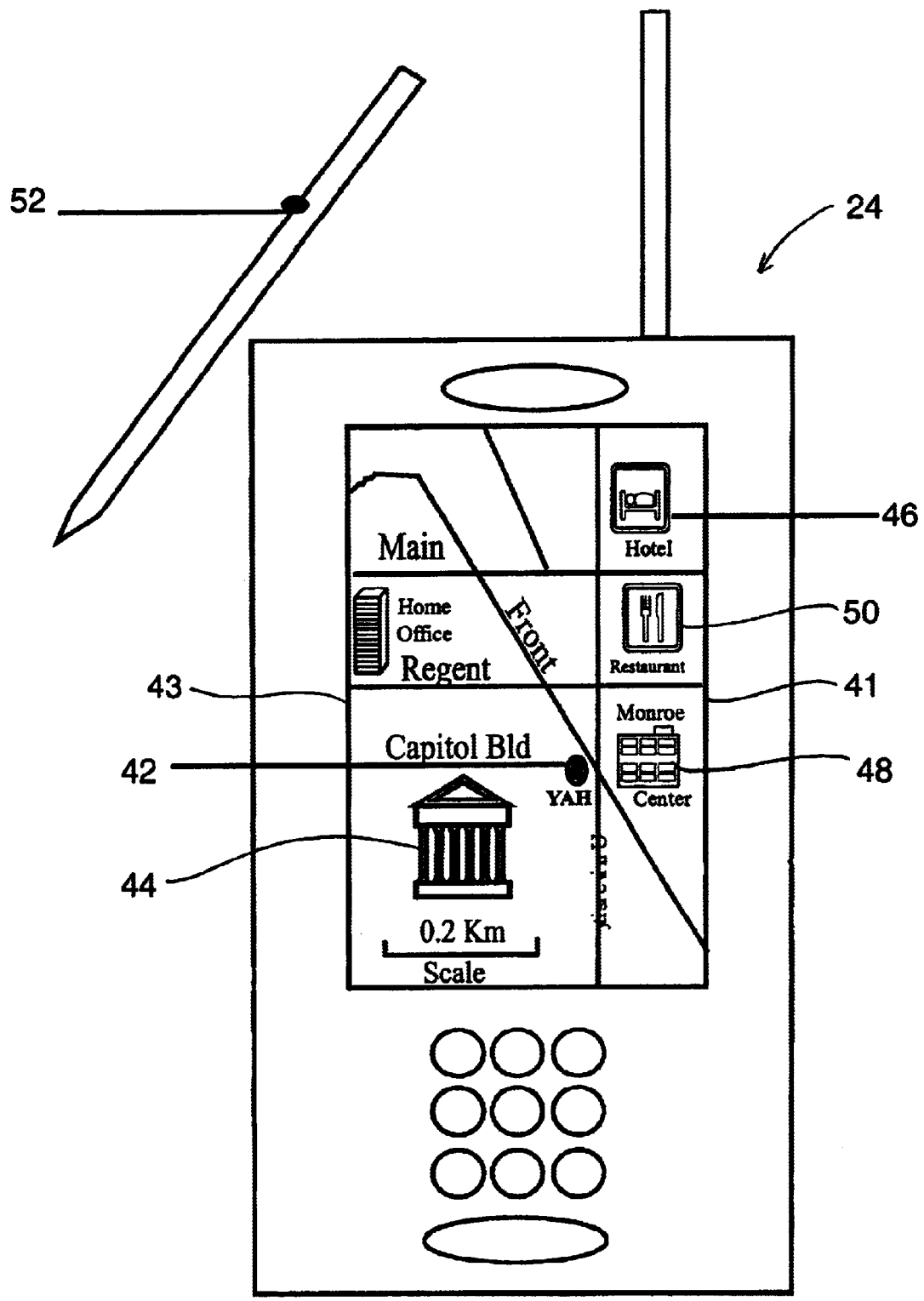
FIG. 4 is one embodiment of a user terminal for use in accordance with the present invention.

FIG. 4 shows one embodiment of the user terminal 24 for defining the asymmetrical user zone of FIG. 3. The user terminal 24 is a telephone or wireless data device that has an integrated graphical user interface 41 to create user defined zones of service operation in real-time in connection with a wireless communication network. The current position of the user is shown on the graphical user interface 41 by a "you are here" (YAH) indicator 42. The position of the user terminal 24 is known because the user terminal 24 includes a GPS receiver 43.

GPS is widely used in mobile vehicles and portable user terminals to provide accurate location identification in terms of geographical coordinates. GPS data is transmitted by a network of GPS satellites orbiting the earth to provide real-time, continuous location information to the GPS receiver 43 contained within the user terminal 24. Alternatively, location information can be determined by the wireless service provider by known triangulation methods to determine the location of the user terminal within the wireless communications network.

Using the graphical user interface 41, the user defines a desired area of operation to subscribe to service options or features for a temporary duration. The graphical user interface 41 provides a map with a grid overlay or a grid interface to the user. The user selects the distance scale as described above to define the available area of interest. Preferably the map includes street and landmark information of the present location. The grid presentation provides landmark information of the location including significant buildings 44, hotels 46, conference centers 48, restaurants 50, or the like. Using the stylist 52, the user may select the points to be associated with the desired user's zone. For example, the user may select a simple radius of service from the present location 42 defining a circle of service with a radius for the user zone. Alternatively, or in addition, the user may define points on the map creating a polygon service area like that shown in FIG. 3. This information is then communicated to the MSC wherein the service provider combines the desired points with line segments to define an enclosed user zone. Of course, a track-ball, touch screen, light pen, mouse, keypad or other pointing devices could be used in place of the pointing stylus to provide the input means.

Rather than incorporating a GPS receiver into the user terminal 24, a map can also be downloaded to the user terminal 24 from the communication service provider. This allows the user to define a desired radius of service, or select points to define vectors to define a desired user zone. This has an additional benefit because the defined user zone need not be referenced from the present location of the user terminal 24.

The described method of over-the-air user zone assignment allows the user to reserve system capacity and to subscribe to features from the wireless service provider for the duration of the temporary user defined zone. Typically, however, a user would define a temporary user zone when operating outside of their normal service areas.

The present user zone assignment method also allows multiple wireless service providers to compete for the desired temporary user zone. In such a case, the user defines a desired zone of interest as described above with reference to FIG. 4, and transmits the desired user zone and communication service options to all of the wireless service providers in the transmission area. The wireless service providers, in turn, transmit a response to the user terminal 24. It is contemplated that service providers with available network resources could likely provide a more competitive quote than over-burdened service providers in the area. This has the obvious benefit of reducing the cost to the users and providing incremental service fees to service providers with available network resources.

Figure 5:
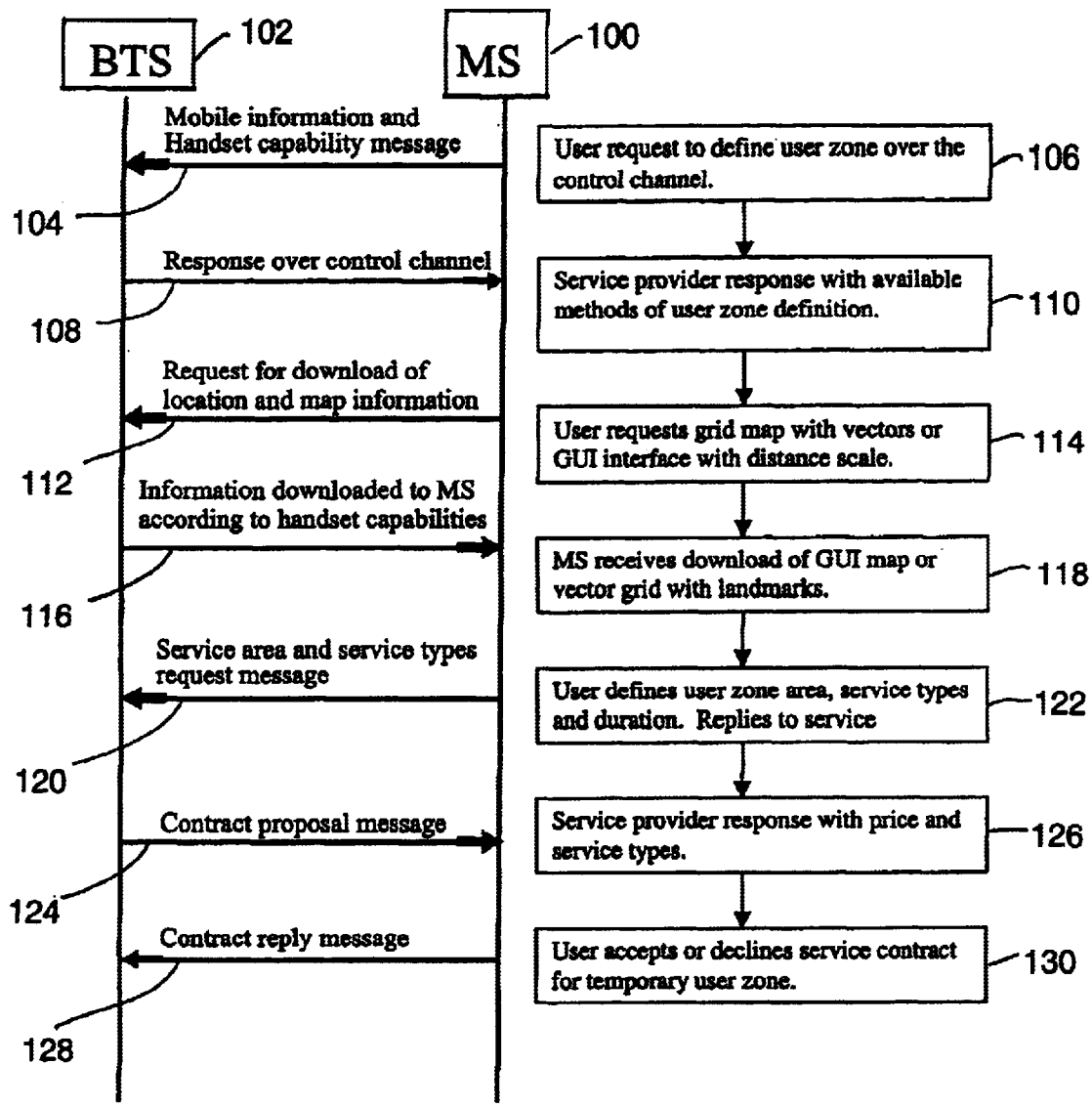
FIG. 5 is a flow diagram representing an exchange between a mobile unit and service provider in accordance with an embodiment of the present invention.

FIG. 5 shows a flow diagram representing a communication exchange between a mobile station (MS) or handset 100 and a potential service provider via a base transceiver station (BTS) 102. The left side of the diagram illustrates the MS and BTS exchange, and the right side illustrates the user actions or information.

In operation, the MS 100 establishes a communication link with the BTS 102 upon entering a potential user zone as shown at 104. The user then requests to define a user zone over the control channel 106. A response is communicated by the service provider to the user indicating available methods of user zone definition such as described above 108, 110. For example, the user can request a grid map with vectors or a GUI interface with distance scale 112, 114. The requested information is then downloaded 116 and received and displayed by the MS 118. The user then defines a user zone as described above, as well as the desired service type and duration 120, 122. In response, the service provider proposes a contract 124, 126, which is either accepted, rejected, or modified by the user 128, 130.

The service set available to the user can be administered via Wireless Intelligent Networks, Advanced Intelligent Networks, Advanced Intelligent Networks, Virtual Private Networking or other such techniques as accorded by the service providers.

From the foregoing it will be seen that there has been brought to the art a new and improved wireless communication system which has advantages over present mobile communication systems. While the invention has been described in connection with one or more embodiments, it will be understood that the invention is not limited to those embodiments. On the contrary, the invention covers all alternatives, modifications and equivalents, as may be included within the spirit and scope of the appended claims.

What is claimed is:

1. In a wireless communication system including a network controller providing communication services to a plurality of mobile user terminals, a method of defining user-selected user zones associated with each of said user terminals comprising the steps of:

locating a user tern within said wireless communication system;

defining an area by providing at least one user-selected vector from said user terminal location, said at least one vector comprising a radius or distance vector;

transmitting said vector information to said network controller; and generating at the network controller, a user zone around said user terminal corresponding to said area wherein said user terminal can request communication services of said communication system without incurring out-of-network fees.

2. The method of claim 1 wherein the step of locating a user terminal within said wireless communication system includes the step of receiving at the user terminal global positioning system (GPS) signals and providing coordinates indicating location of the user terminal.

3. The method of claim 2 wherein the step of providing coordinates indicating location of the user terminal includes the step of displaying the location of the user terminal referenced to a map on a display of the user terminal.

4. In a wireless communication system including a network controller providing communication services to a plurality of mobile user terminals, a method of defining user-selected user zones associated with each of said user terminals comprising the steps of:

locating a user terminal within said wireless communication system;

referencing a plurality of vectors from said user terminal location, each of said vectors providing a distance and angle measurement referenced from a predetermined direction from the location of the user terminal;

transmitting said vector information to said network controller; and generating at the network controller, a user zone associated with said user terminal as a function of said vector information by connecting each end point defined by each of said vectors to form said user zone, said user zone defining a geographic region wherein said user terminal can request communication services of said communication system without incurring out-of-network fees.

5. In a wireless communication system including a network controller providing communication services to a plurality of mobile user terminals, a method of defining user-selected user zones associated with each of said user terminals comprising the steps of:

locating a user terminal within said wireless communication system;

referencing a vector representing a radius (r) from said user terminal location;

transmitting said vector information to said network controller; and generating at the network controller, a user zone associated with said user terminal as a function of said vector information by defining a circle about said user terminal of radius r to form said user zone, said user zone defining a geographic region wherein said user terminal can request communication services of said communication system without incurring out-of-network fees.

6. The method of claim 1 wherein said network controller is a mobile switching center.

7. A wireless communication system comprising, in combination:

a network controller for processing communication data transmitted to, and received from, a plurality of mobile user terminals;

at least one of said mobile user terminals including a global position system (GPS) receiver for locating said user terminal within said wireless communication system and a user display for selecting an area as a function of a radius or a plurality of distance vectors to define a preferred user zone;

said network controller including a processor for generating a user-selected user zone associated with each of said user terminals as a function of the defined preferred user zone, said user zone comprising a geographic region wherein said user terminal can request communication services of said communication system without incurring out-of-network fees.

8. The wireless communication system of claim 7 wherein the network controller is a mobile switching center.

9. The wireless communication system of claim 7 wherein said communication data includes voice and data information.

10. The wireless communication system of claim 7 wherein said mobile user terminal includes means for inputting at least one user-selected vector referenced from said user terminal location, said at least one vector being used to generate said user zone.

11. The wireless communication system of claim 7 wherein said mobile user terminal includes a stylus in operative communication with said display, said stylus being used to referencing at least one user-selected vector from said user terminal location, said at least one vector being used to generate said user zone.

12. The wireless communication system of claim 11 wherein said display includes a map referencing the position of the user terminal with respect to at least one landmark.

13. In a geographic region serviced by at least two wireless communication service providers, each of said service providers having a wireless communication system including a network controller providing communication services to a plurality of mobile user terminals, a method of requesting communication services by a user within a user-defined user zone comprising the steps of:

locating a user terminal within said geographic region serviced by at least two wireless communication service providers;

referencing at least one user-selected vector representing a radius from said user terminal location;

transmitting from said user terminal, said vector data to said wireless communication service providers; and receiving from at least one of said wireless communication service providers a quote for services within said user-defined a user zone comprising a geographic region defined substantially as a circle of said radius.

14. The method of claim 13 further comprising the step of transmitting from said user terminal a request for voice communication services to said wireless communication service providers.

15. The method of claim 13 further comprising the step of transmitting from said user terminal a request for data transmission services to said wireless communication service providers.

16. The method of claim 13 wherein the step of receiving from at least one of said wireless communication service providers a quote for services includes a quote for voice communication services.

17. The method of claim 13 wherein the step of receiving from at least one of said wireless communication service providers a quote for services includes a quote for data transmission services.

* * * * *